US007016990B1

(12) United States Patent
Chartier

(10) Patent No.: US 7,016,990 B1
(45) Date of Patent: Mar. 21, 2006

(54) MOBILE COMPUTING SYSTEM HAVING A MODEM FOR OPERATION INDEPENDENT OF A MAIN PROCESSOR AND METHOD THEREFOR

(75) Inventor: Michael S. Chartier, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 09/649,268

(22) Filed: Aug. 28, 2000

(51) Int. Cl.
  G06F 3/00 (2006.01)
  G06F 13/12 (2006.01)
(52) U.S. Cl. .............. 710/62; 710/5; 710/6; 710/8; 710/15; 710/19
(58) Field of Classification Search ............. 710/62, 710/15–19, 8, 11, 14, 5, 6; 713/320, 323, 713/324
See application file for complete search history.

(56) References Cited

U.S. PATENT DOCUMENTS 5,748,084 A * 5/1998 Isikoff .................. 713/200
6,418,533 B1 * 7/2002 Angelo et al. .......... 713/200

OTHER PUBLICATIONS

Intel Microsoft Toshiba; Advanced Configuration and Power Interface Specification; Feb. 2, 1999; Intel Microsoft Toshiba; Revicsion 1.0b; particularly Chapters 1,3,5, and 9.*

* cited by examiner

Primary Examiner—Kim Huynh
Assistant Examiner—Joshua D Schneider
(74) Attorney, Agent, or Firm—Stuart A. Whittington

(57) ABSTRACT

Briefly, in accordance with one embodiment of the invention, a portable computing device includes a modem that may operate independently from a main processor. The modem may be used to download communication data while the main processor is inactive or powered off.

17 Claims, 1 Drawing Sheet

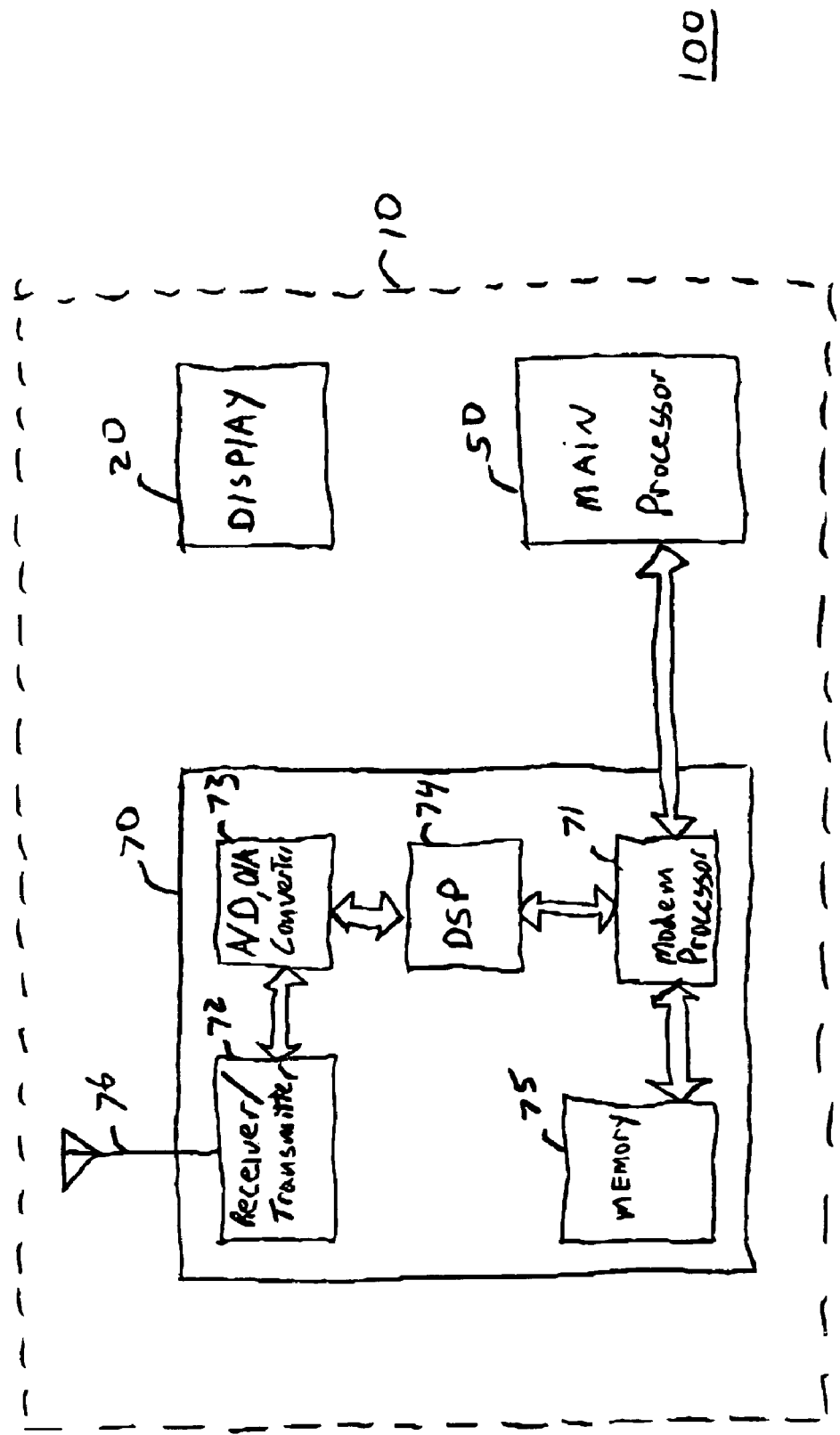

MOBILE COMPUTING SYSTEM HAVING A MODEM FOR OPERATION INDEPENDENT OF A MAIN PROCESSOR AND METHOD THEREFOR

BACKGROUND

The use of batteries to power portable computing devices (e.g., laptop computers, palmtop computers, personal digital assistants (PDA's), etc.) typically offer users the flexibility of operating the devices where ever the user desires. However, the current state of battery technology is not capable of providing an indefinite supply of power to the devices. This is due, at least in part, to the amount of power that may be consumed by some of the components of a portable computing device. Components such as the display, processor, and hard disk drive are typically responsible for a large portion of the power used by mobile devices.

Consequently, many portable computing devices have a stand-by or idle mode that attempts to reduce the amount of power that is consumed when the device is not actively being used by the user. However, these low-power modes attempt to deactivate many, if not all, of the components in the portable computing device. For example, the PC98 Design Guide proposed by Intel Corporation and Microsoft Corporation calls for power to be removed from the main processor when the computing device is turned off. In addition, when power to the main processor is removed, power is also removed from any of the components in a portable computing device that share the same power source.

Consequently, the other components of the portable computing device may not be used. This generally prohibits any wireless or wired communication with other components or a network when the main processor is disabled. Thus, there is a continuing need for better ways to improve the operation of portable communication devices.

BRIEF DESCRIPTION OF THE DRAWING

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawing in which:

the sole FIGURE is a block diagram representation of an embodiment of a system having a modem in accordance with the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm or program is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may also mean that two or more elements are in direct physical or electrical contact. However, "coupled" may also mean that two or more elements are not in direct contact with each other, but yet still co-operate or interact with each other.

Turning to the FIGURE, an embodiment 100 in accordance with the present invention is described. Embodiment 100 may comprise a portable computing device 10 that may comprise, for example, a laptop computer, a palmtop computer, a PDA, or the like. However, it should be understood that only a portion of portable computing device 10 is included in the FIGURE and that the scope of the present invention is not limited to these examples.

Portable computing device 10 may comprise a main processor 50, such as a Pentium III processor™ from Intel Corporation, Santa Clara, Calif., that may be used to execute programs for a user. For example, main processor 50 may execute application programs as desired by the user or execute operating software used to control the components within or external to portable computing device 10. Portable computing device 10 may optionally comprise a display 20 to provide the user with requested information. It should also be understood that portable communication device 10 may comprise other components such as a disk drive, Input/Output (IO) devices, and the like, although the scope of the present invention is not limited in this respect.

Portable computing device 10 may also comprise a modem 70 that may be used to receive or transmit data while main processor 50 is deactivated. As explained in more detail below, modem 70 may be programmed to download or transmit information when main processor 50 is in an idle mode or is turned off altogether. For example, a user may program modem 70 to download data, such as email, stock data, news articles, etc, wile portable computing device is otherwise inactive. Thus, modem 70 may be used to retrieve communications from a network while main processor 50 is inactive or even powered off.

In this particular embodiment, modem 70 uses a wireless system to receive and transmit communication from a network, although the scope of the present invention is not limited in this respect. In alternative embodiments, modem 70 may use a wired connection, such as a phone line, network cable, etc., to receive or transmit communications with a network.

In a wireless embodiment, modem 70 may comprise an antennae 76 and a receive/transmitter unit 72 to broadcast and receive radio frequency (RF) communications. It should be understood, however, that the scope of the present invention is not limited by the particular frequency used to communicate portable computing device 10. Modem 70 may also optionally comprise an A/D, D/A converter 73 and a digital signal processor (DSP) 74 that may be used to process base band or intermediate frequency (IF) signals. Modem 70 may also comprise other components, such as filters, decoders, multipliers, etc., (not shown) that may be used to process a received communication or to transmit a communication.

Modem 79 may also comprise a modem processor 71 that may be programmed to store messages in memory 75. Although the scope of the present invention is not limited in this respect, memory 75 may comprise non-volatile memory, such as flash memory, EEPROM's, etc., and/or volatile memory such as SRAM. Among other things, memory 75 may be used to store the instructions to be executed by modem processor 71 when main processor 50 is inactive. Memory 75 may also comprises a variety of different types of memory that have different power consumption characteristics. For example, memory 75 may comprise flash memory and static random access memory (SRAM). In some embodiments, the SRAM memory may be used as temporary storage until it is appropriate to transfer the data from the SRAM memory to the flash memory.

Memory 75 may also be used to store user profile information, such as user account information to be used to connect to a network. In addition, memory 75 may be used to store data indicating what information is to be retrieved or transmitted by modem 75 and stored in memory 75. For example, memory 75 may programmed by a user to identify which emails are to be downloaded or transmitted, what data is to be downloaded from the network (e.g., the names of files), or what data is to be downloaded from the internet (e.g., stock data), although the scope of the present invention is not limited in this respect.

In accordance with a particular embodiment of the present invention, a user may program modem 70 with the user profile data using main processor 50. Alternatively, the user profile data may be downloaded from a network using modem 70. When portable computing device 10 is not actively being used by a user (e.g., main processor 50 is inactive or powered off), modem processor 70 may execute instructions so that modem 70 establishes communication with a network. Thus, modem processor 71 may operate independently from main processor 50. For example, modem 70 may be used to connect to a network when portable computing device 10 is recharging or otherwise inactive. In particular embodiments, this may be desirable to reduce the amount of power that is consumed by portable computing device 10. Alternatively, in some embodiments it may be desirable to complete remove all power to main processor 50 so that main processor 50 consumes substantially no current or power.

Once a connection has been established, modem processor 71 may download communications and store them in memory 75. Modem processor 71 may also generate the appropriate control signals so that modem 70 transmits messages from memory 75. Thus, modem 70 may be used to share data with a network even though the main processor (e.g., main processor 50) of portable computing device is inactive. Although the scope of the present invention is not limited in this respect, modem 70 may be used to receive or transmit communications when power is removed from main processor 50. Alternatively, the user may program modem 70 to identify when modem 70 is to receive or transmit data. This may desirable so that the user may connect to a network during periods of reduced traffic or networking costs.

After data has been stored in memory 75, the user may active portable computing device 10 and use main processor 50 to access the data (e.g., communications) that were downloaded from the network. For example, the user may use main processor 50 to read the email that was downloaded or access the files that were downloaded. Main processor 50 may also be used to output the data to display 20, to a printer, or store the data on another storage device, such as a hard drive.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A portable computing system comprising:
   a modem adapted to receive a communication;
   a processor coupled to the modem and the processor to be periodically inactivated to reduce power consumption of the portable computing system; and
   a non-volatile memory device coupled to the modem and the processor, wherein the modem is adapted to store at least a portion of the communication in the non-volatile memory for future use by a user, wherein the at least a portion of the communication is stored while the processor is inactive.

2. The portable computing system of claim 1, further comprising a hard drive coupled to the processor.

3. The portable computing system of claim 1, further comprising a modem processor, wherein the modem processor is adapted to operate independently of the processor.

4. The portable computing system of claim 3, wherein the modem processor is adapted to store at least a portion of the communication in the non-volatile memory when the processor is powered off.

5. The portable computing system of claim 1, wherein the modem is adapted to transmit a message when the processor is inactive.

6. The portable computing system of claim 5, wherein the non-volatile memory is adapted to store the transmitted message.

7. The portable computing system of claim 1, wherein the non-volatile memory is adapted to store user profile information indicative of what communications are to be stored in the non-volatile memory.

8. A method of retrieving data with a portable computing device having a modem, a first processor, and a second processor, the method comprising:
   deactivating the first processor of the portable computing device to conserve power consumption of the portable computing device;
   activating the second processor so that the modem receives the data; and
   storing the data with the second processor for future use by a user while the first processor is deactivated.

9. The method of claim 8, wherein deactivating the first processor includes disabling a power supply so that the first processor consumes substantially no power.

10. The method of claim 8, wherein storing the data includes storing the data in a non-volatile memory.

11. The method of claim 10, wherein storing the data includes transferring the data from the modem to a flash memory array with the second processor.

12. The method of claim 8, further comprising:
    activating the first processor; and
    accessing the data with the first processor.

13. The method of claim 8, further comprising initializing the second processor to identify the data to be stored.

14. The method of claim 13, wherein initializing the second processor includes storing user profile data.

15. The method of claim 8, further comprising initializing the modem with the fist processor to identify the data to be stored.

16. The method of claim 15, wherein initializing the modem includes storing user profile data in a non-volatile memory device with the first processor.

17. The method of claim 8, wherein activating the second processor includes enabling the modem to receive a wireless communication comprising at least a portion of the data to be stored.

\* \* \* \* \*